SCREEN OVER WINDOW OPENING IN TAPE PLAYER

Filed July 22, 1966

INVENTOR
THEOPHIEL CLEMENT JOZEF LODEWIJK STAAR
by: Wolfe, Hubbard, Voit & Osann
ATTYS.

United States Patent Office 3,400,936
Patented Sept. 10, 1968

3,400,936
SCREEN OVER WINDOW OPENING IN TAPE PLAYER

Theophiel Clement Jozef Lodewijk Staar, Kraainem, Belgium, assignor to Staar, S.A., Brussels, Belgium, a corporation of Belgium Filed July 22, 1966, Ser. No. 567,220
Claims priority, application Belgium, Dec. 3, 1965, Patent 673,258
2 Claims. (Cl. 274—11)

ABSTRACT OF THE DISCLOSURE

A retractable cover is provided over a window opening of a cartridge-type tape player. Insertion of the cartridge to the play position retracts the cover to allow visual access to the cartridge, and withdrawal of the cartridge allows the cover under the action of a return spring to enclose and protect the player drive mechanism.

This invention relates generally to apparatus for the recording and playback of sound from a magnetic tape in a self-contained cartridge or cassette. More particularly, this invention relates to tape recorders having an enclosure having means whereby visual access is provided to the tape cartridge during operation so that titles and other information may be observed.

In tape recording and playback apparatus adapted to receive and play self-contained cartridges of magnetic tape, it is advantageous that a portion of the cartridge be visible during its use to allow the user to observe titles or other information which may be written thereon. Also, it is common to provide a transparent window on one principal face of the cartridge through which the reels of tape may be observed to determine the state of winding or unwinding of the tape within. Such a window must necessarily be placed on one of the principal flat faces of the tape cartridge, and written information is generally recorded on this face as well. The tape itself is exposed for contact with a recording or playback sound head on one of the narrow faces of the cartridge adjacent the principal face containing the window, title, and other written information.

In the operation of cartridge-type tape recorders, it is common for the cartridge to be inserted narrow-end-first with the narrow face containing the exposed portion of tape being inserted first into the mechanism to make contact with the sound head within. Because only a narrow opening need be provided in the machine for this purpose, the rest of the tape recorder mechanism may be completely enclosed to cover and protect the mechanism within. This, however, causes all but the narrow edge at the rear of the cartridge to disappear from the operator's view, cutting off any visual reference to the cartridge window or other written information which may be contained on the principal face.

Accordingly, it is a principal object of the present invention to provide an enclosure for cartridge-type tape recorders in which the internal mechanism may be substantially enclosed and protected at all times, while allowing one principal face of the tape cartridge to be observed by the operator during operation.

Another object is to provide an enclosure of the above description in which a retractable cover withdraws during operation to allow visual access to a cartridge within, and returns to enclose and protect the tape recorder mechanism when a cartridge is not in playing position. A related object is to provide such a cover which is operative to retract and advance by the insertion or withdrawal of a cartridge by the operator.

Other objects and advantages of the invention will become apparent upon reading the following detailed description and upon reference to the drawings, in which.

Figures 1, 2, 3, 4:
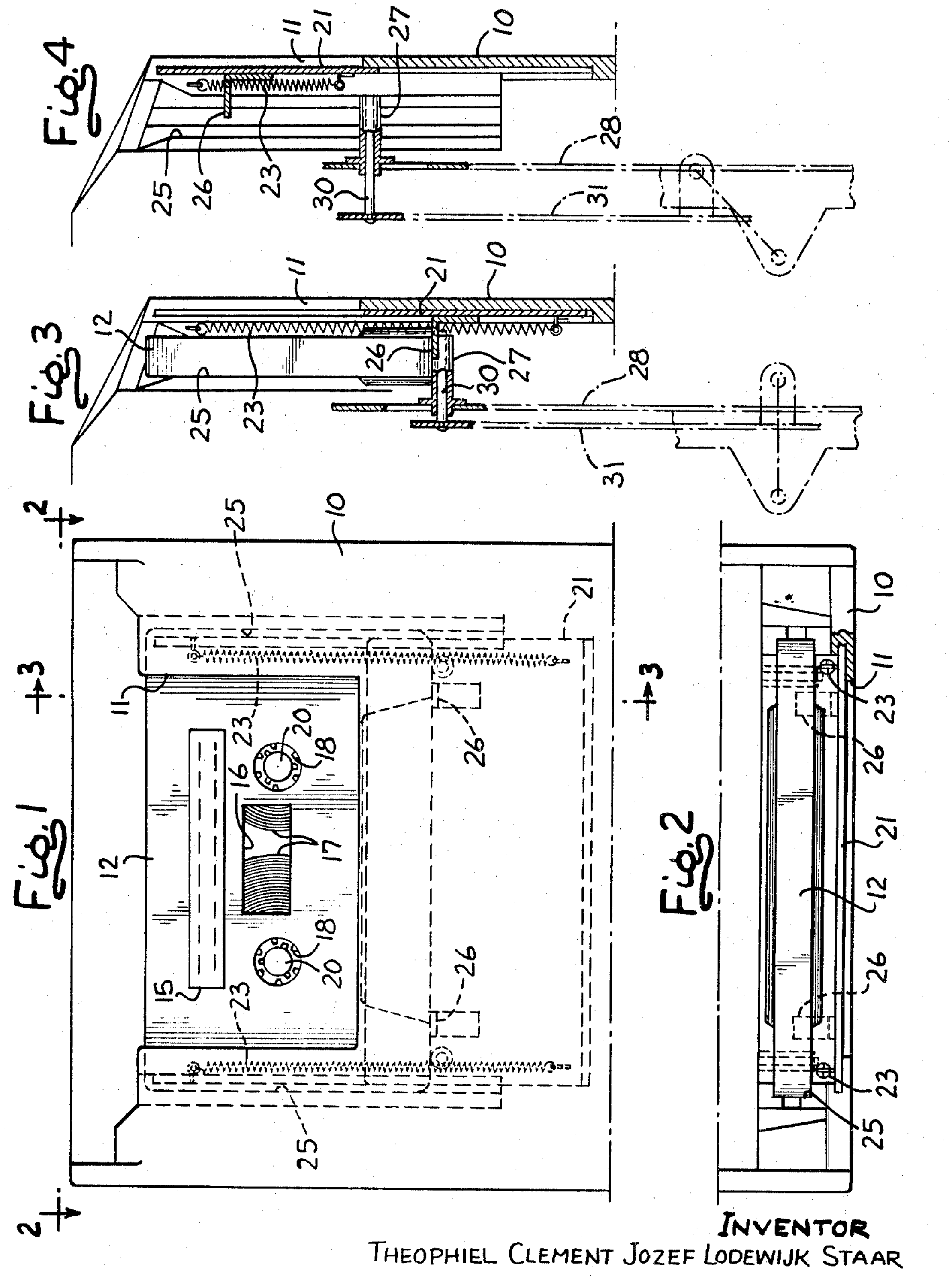
FIGURE 1 is a plan view of the tape recorder enclosure of the present invention with a tape cartridge in playing position.
FIG. 2 is an end view taken in the plane 2–2 of FIGURE 1.
FIG. 3 is a partial section taken in the plane 3–3 of FIGURE 1.
FIG. 4 is a partial section similar to that of FIG. 3, with the tape cartridge having been removed.

While the invention will be described in connection with a preferred embodiment, it will be understood that I do not intend to limit the invention to that embodiment, but intend to cover all alternatives and equivalent constructions as may be included within the spirit and scope of the invention as defined by the appended claims.

Turning first to FIGURE 1, there is shown a tape recorder having an enclosure constructed according to the present invention. A case 10 contains the tape deck, electronics, and associated controls (not shown), and has on its upper surface a cut-out opening 11 in which a tape cartridge 12 is visible in operating position. Through the opening 11 may be seen one principal face 13 of the cartridge 12, on which face is contained written information 15 such as a title, and a window 16 through which the reels of magnetic tape 17 may be observed. Also visible are tape reel hubs 18 within the cartridge and drive sprockets 20 which project from the tape deck drive mechanism below into an engagement with the reel hubs 18.

As is best shown in FIG. 3, a slidable cover 21 is retained in slots or grooves 22 in the case 10, and is slidable outwards as the cartridge 12 is withdrawn to completely cover the opening 11 (FIG. 4). A pair of return springs 23 resiliently urges the cover 21 into the closed position when no cartridge is in place. The grooves 22 in which the cover 21 is slidable are parallel and adjacent to guide slots 25 into which the cartridge 12 is inserted by the operator.

It may be seen that when a cartridge 12 is in operating position as shown in FIG. 1, the mechanism of the tape deck lying beneath the cartridge is hidden from view and protected from exposure to dirt or other foreign matter. The drive sprockets 20 comprise the only visible portion of the tape drive and control mechanism which engages the cartridge from beneath. Such engagement is preferably accomplished by means of the mechanism disclosed and claimed in my co-pending application Ser. No. 567,115, filed July 22, 1966, now Patent No. 3,385,534. In that application a tape recorder tape deck mechanism is described in which the tape drive and control elements become operably engaged with the tape cartridge as it is inserted by the operator in a plane parallel to the principal faces of the cartridge. Such a mechanism is employed in the illustrated embodiment of the present invention, but it will be understood that the application of the invention need not be so limited.

Beneath the slidable cover 21 are lugs 26 which are engaged by the cartridge 12 as the latter is inserted into place. As the cartridge slides forward in its guide slots 25, it engages the lugs 26 and thereby carries the cover 21 forward until it comes to rest (FIG. 3) in operating position. In this position, the slidable cover 21 is completely withdrawn beneath the case 10 and is hidden from view. By positioning the lugs 26 somewhat to the rear of the front edge of the cover 21, it will be observed that the cover 21 overlaps the leading edge of the cartridge 12, thereby eliminating any gap through which dirt or debris might fall into the mechanism below during the insertion of the cartridge.

As is more fully described in my Patent No. 3,385,534, previously mentioned, the cartridge 12 on being inserted into operating position engages a pair of hollow lugs 27 which are slidably retained on a fixed frame 28 and contain slidable pins 30 affixed to a movable frame 31. The fixed frame 28 and movable frame 31 are interconnected by a deformable parallelogram linkage (not shown) whereby the movable frame 31 rises vertically against the force of a return spring (not shown) with respect to the advancing cartridge 12 as the latter is inserted by the operator. All of the necessary drive elements which engage the cartridge 12 are mounted on the movable frame 31, and thereby penetrate and engage the cartridge with a wholly vertical movement. This engagement, it will be seen, is accomplished simultaneously with the retraction of the cover 21 from the opening 11, so that when the cartridge 12 is in operating position and fully engaged with the drive mechanism, the cover 21 is fully retracted and the principal face of the cartridge 12 containing the window 16 and title 15 are completely exposed to view.

When the operator removes the cartridge 12 from the machine, the slidable lugs 27 follow the cartridge in the direction of removal since the movable frame 31 is biased in that direction by the return spring (not shown) which causes the movable frame and associated drive elements to be withdrawn from the cartridge. In a like fashion, the lugs 26 on the slidable cover 21 follow the cartridge 12 as it is withdrawn, and the return springs 23 return the cover 21 to the closed position in which the opening 11 is again sealed, protecting and hiding the mechanism beneath.

It will be evident that the action of the cartridge 12 on the slidable cover 21 may be effected either directly with lugs 26 such as have been described, or indirectly by other mechanism interconnected with the slidable lugs 27 or the movable frame 31 without departing from the present invention.

I claim as my invention:

1. For use with self-contained tape cartridges having a principal face on which visual information is displayed, a tape deck enclosure comprising, in combination, an outer case substantially enclosing a tape cartridge when in operating position but having a visible opening corresponding to one principal face of said cartridge, a retractable cover for covering said opening, and retracting means operative by the insertion of a cartridge for retracting said cover away from said opening, said means being additionally operative to return said cover to close said opening when a cartridge is removed.

2. The tape deck enclosure of claim 1 in which said retracting means comprises grooves for guiding and retaining said cover during retracting movement, lug means for engaging said cartridge when said cartridge is in operation or being inserted or removed, and spring means for resiliently urging said cover into a normally closed position in which said cover blocks said opening from view.

References Cited

UNITED STATES PATENTS

| | | | |
|---|---|---|---|
| 3,319,858 | 5/1967 | Schober et al. | 242—55.19 |
| 2,635,035 | 3/1953 | Eddy | 242—55.19 |

LEONARD FORMAN, *Primary Examiner.*

R. A. FIELDS, *Assistant Examiner.*